(12) United States Patent  (10) Patent No.: US 7,794,001 B2
Blackwell et al.  (45) Date of Patent: Sep. 14, 2010

(54) MOBILE MEDICAL FACILITY

(75) Inventors: Thomas H. Blackwell, Charlotte, NC (US); Kevin T. Staley, Charlotte, NC (US)

(73) Assignee: Charlotte-Mecklenburg Hospital Authority d/b/a Carolinas Medical Center, Charlotte, NC (US)

( * ) Notice: Subject to any disclaimer, the term of this patent is extended or adjusted under 35 U.S.C. 154(b) by 743 days.

(21) Appl. No.: 10/552,135

(22) PCT Filed: May 9, 2005

(86) PCT No.: PCT/US2005/016261

§ 371 (c)(1),
(2), (4) Date: Oct. 6, 2005

(87) PCT Pub. No.: WO2005/112578

PCT Pub. Date: Dec. 1, 2005

(65) Prior Publication Data

US 2007/0102946 A1  May 10, 2007

(51) Int. Cl.
*B60P 3/14* (2006.01)

(52) U.S. Cl. .................. 296/24.38; 296/163; 296/168; 296/26.12; 296/26.15

(58) Field of Classification Search .............. 296/163, 296/165, 168, 171, 172, 175, 26.08, 26.11, 296/26.12, 26.13, 26.14, 26.15, 24.38; 52/67
See application file for complete search history.

(56) References Cited

U.S. PATENT DOCUMENTS 2,370,402 A  2/1945 Gutman
2,677,571 A  5/1954 Williams
2,901,282 A  8/1959 Meaker
3,583,368 A  6/1971 Mandelhaum
4,425,978 A  1/1984 Star
4,546,578 A  10/1985 Behrmann
4,570,733 A  2/1986 Star
4,743,059 A  5/1988 Legueu (Continued)

FOREIGN PATENT DOCUMENTS

DE   195 04 251   8/1996

(Continued)

OTHER PUBLICATIONS

Supplementary Search Report for corresponding European Application No. 05756562 completed Nov. 22, 2007.

(Continued)

*Primary Examiner*—Joseph D Pape
(74) *Attorney, Agent, or Firm*—Alston & Bird LLP

(57) ABSTRACT

A mobile medical facility capable of treating a plurality of patients and being transported over the roadways without requiring extensive transporting means. In general the mobile medical facility includes a trailer. The trailer defines a floor area and has at least a first and second configuration. In the first configuration, the floor area is reduced to allow for transporting of the trailer over the public highways. In the second configuration, the floor area of the trailer is expanded and large enough to support a plurality of beds for treating patients. In some embodiments, the floor area in the second configuration may be at least twice as large as the floor area in the first configuration.

20 Claims, 14 Drawing Sheets

U.S. PATENT DOCUMENTS

| | | | |
|---|---|---|---|
| 4,915,435 A | 4/1990 | Levine | |
| 4,930,837 A | 6/1990 | Marsh et al. | |
| 5,178,481 A | 1/1993 | Kawamura | |
| 5,236,390 A | 8/1993 | Young | |
| 5,383,629 A | 1/1995 | Morgan | |
| 5,398,986 A | 3/1995 | Koob | |
| 5,706,846 A | 1/1998 | Sutton | |
| 5,727,353 A | 3/1998 | Getz et al. | |
| 5,755,478 A | 5/1998 | Kamiya et al. | |
| 5,755,479 A | 5/1998 | Lavin et al. | |
| 5,775,758 A | 7/1998 | Eberspacher | |
| 5,964,065 A | 10/1999 | Migurski et al. | |
| 5,991,947 A | 11/1999 | Lavin et al. | |
| 6,082,799 A | 7/2000 | Marek | |
| 6,179,358 B1 | 1/2001 | Hirayama et al. | |
| 6,209,939 B1 | 4/2001 | Wacker | |
| 6,772,563 B2 | 8/2004 | Kuhn | |
| 7,347,472 B2 * | 3/2008 | Pellegrin, Jr. | 296/24.38 |

FOREIGN PATENT DOCUMENTS

| | | |
|---|---|---|
| EP | 0940292 A2 | 9/1999 |
| JP | 60-34811 | 5/1994 |
| JP | 03-45333 | 5/2000 |
| JP | 2000-142211 A | 5/2000 |
| JP | 37-7660 Y | 10/2005 |
| WO | WO 98/18667 | 5/1998 |

OTHER PUBLICATIONS

International Search Report for International Application No. PCT/US05/16261 mailed May 18, 2006.

*Featherlite* Trailers Marketing Material (19 pgs.).

Miscellaneous Marketing Material/Sales Brochures for Mobile Trailers (65 pgs.).

Civil Docket for Case #: 2:07-cv-00231-wks; *Mobile Medical International Corporation* v. *Advanced Mobile Hospital Systems, Inc. et al.*, District of Vermont, printed Aug. 14, 2008 (Pages 7).

Exhibit No. 3 of Document No. 1(Complaint) of Cite No. 16 above; filed Oct. 30, 2007 (4 pages.).

Exhibit No. 20 of Document No. 10 (Motion for Partial Summary Judgment) of Cite No. 16 above; filed Mar. 6, 2008 (12 pages).

Exhibit No. 22 of Document No. 10 (Motion for Partial Summary Judgment) of Cite No. 16 above; filed Mar. 6, 2008 (3 pages).

Notification of the First Office Action for PCT Application in the National Phase entitled Mobile Medical Facility, The Patent Office of the People's Republic of China, Dec. 7, 2007.

Notification of Second Office Action for PCT Application in the National Phase entitled Mobile Medical Facility, The Patent Office of the People's Republic of China, Jun. 13, 2008.

Japanese Official Action in re JP Patent Application No. 2007-513269 dated Jun. 9, 2009.

* cited by examiner

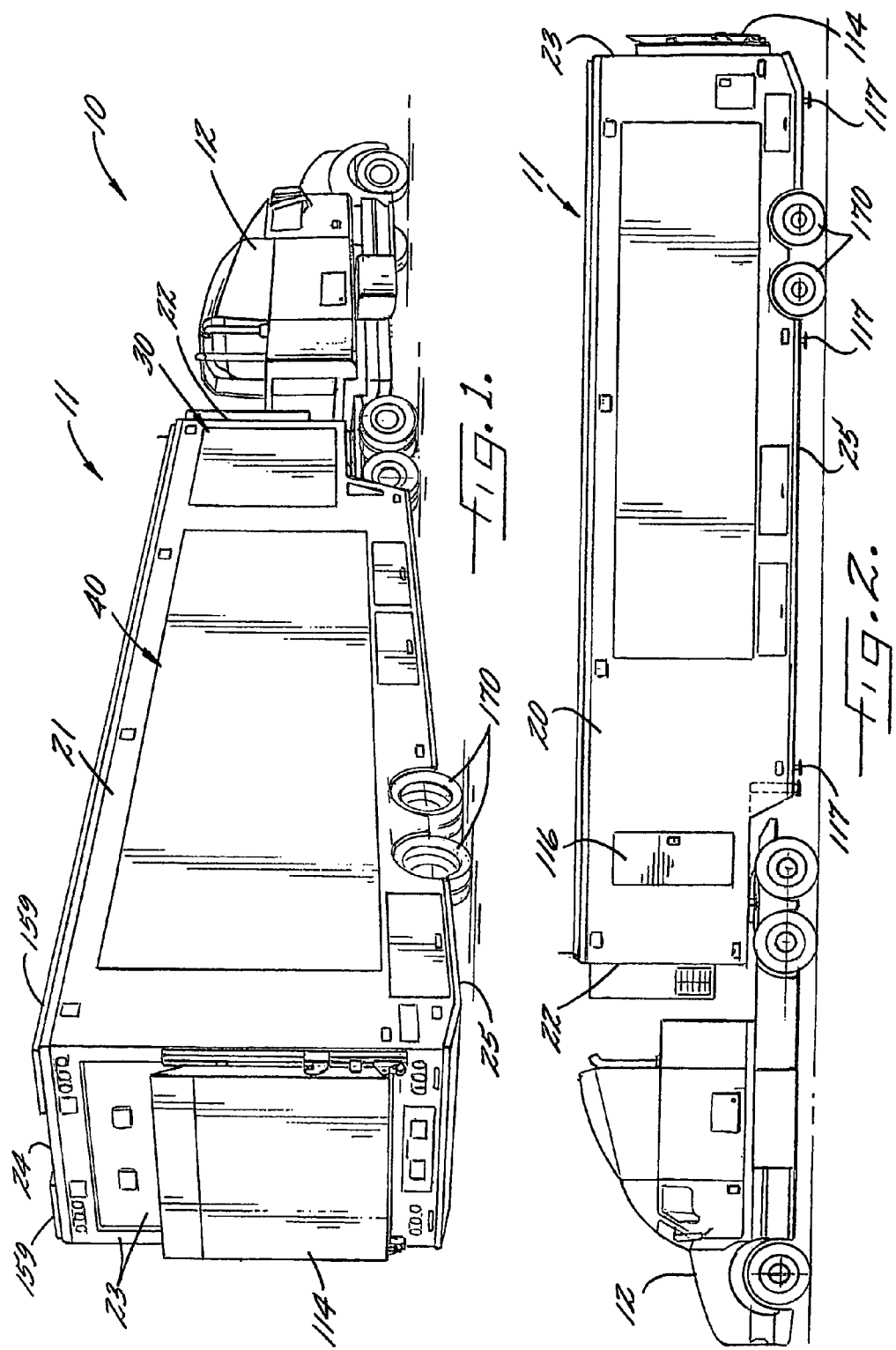

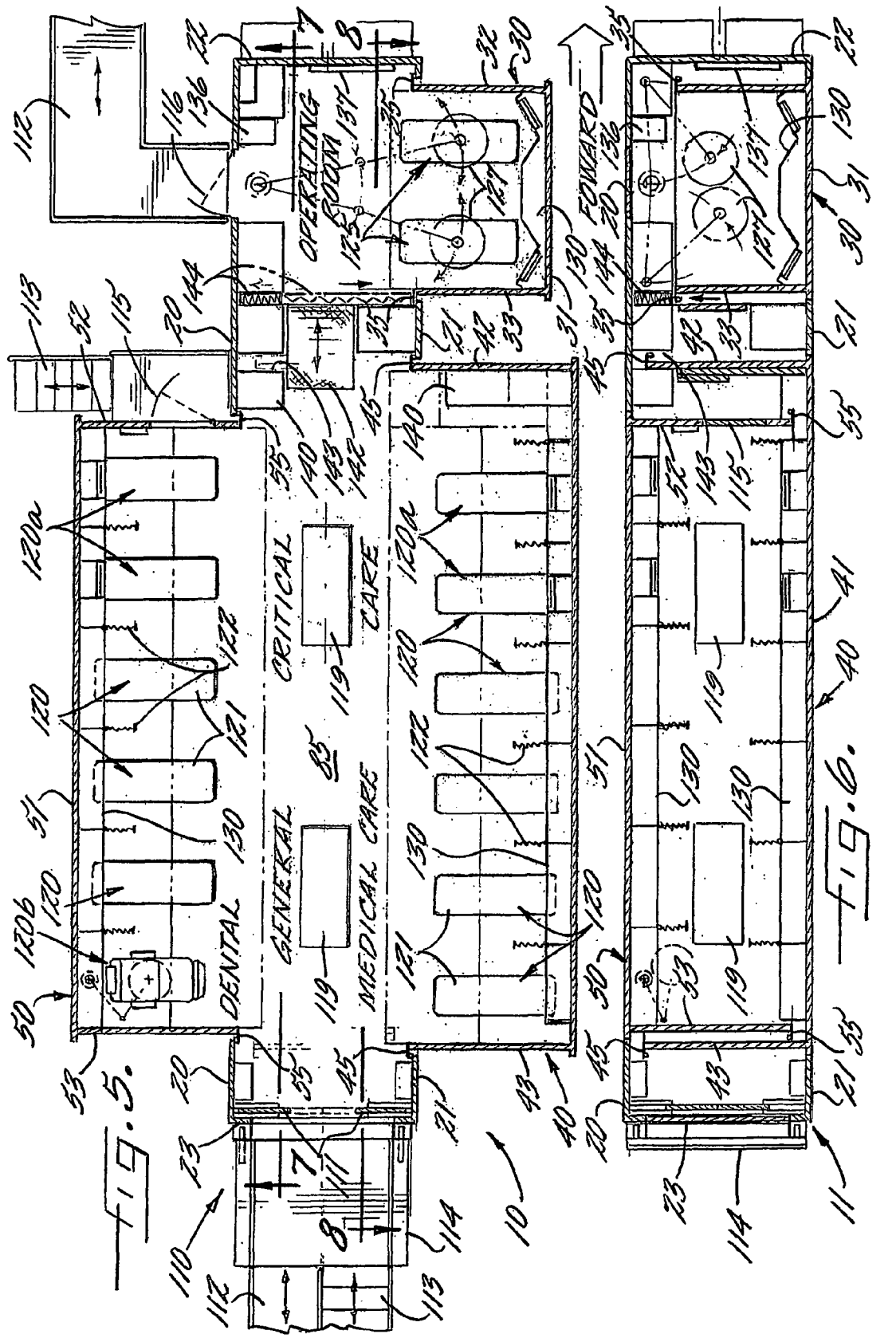

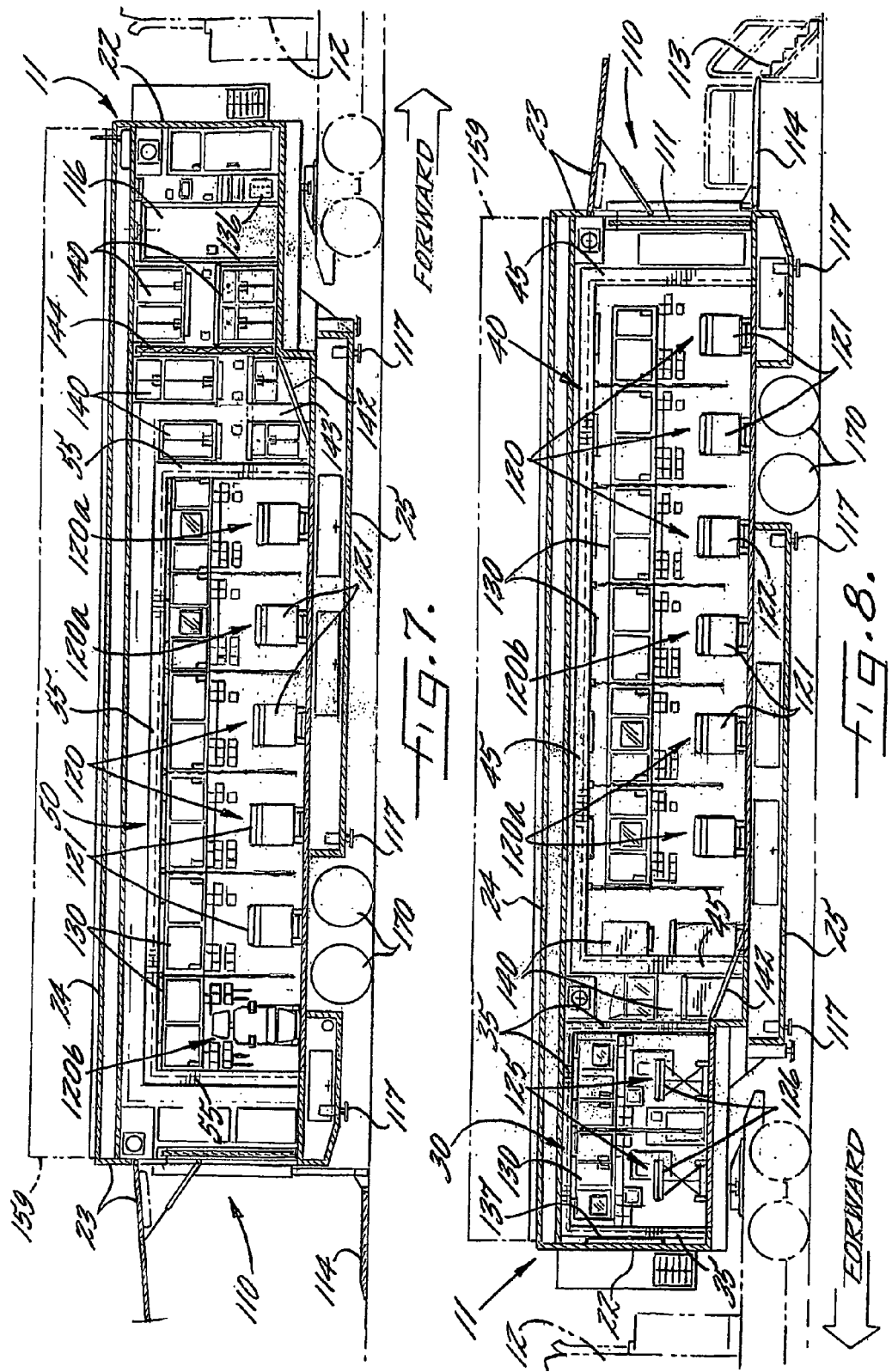

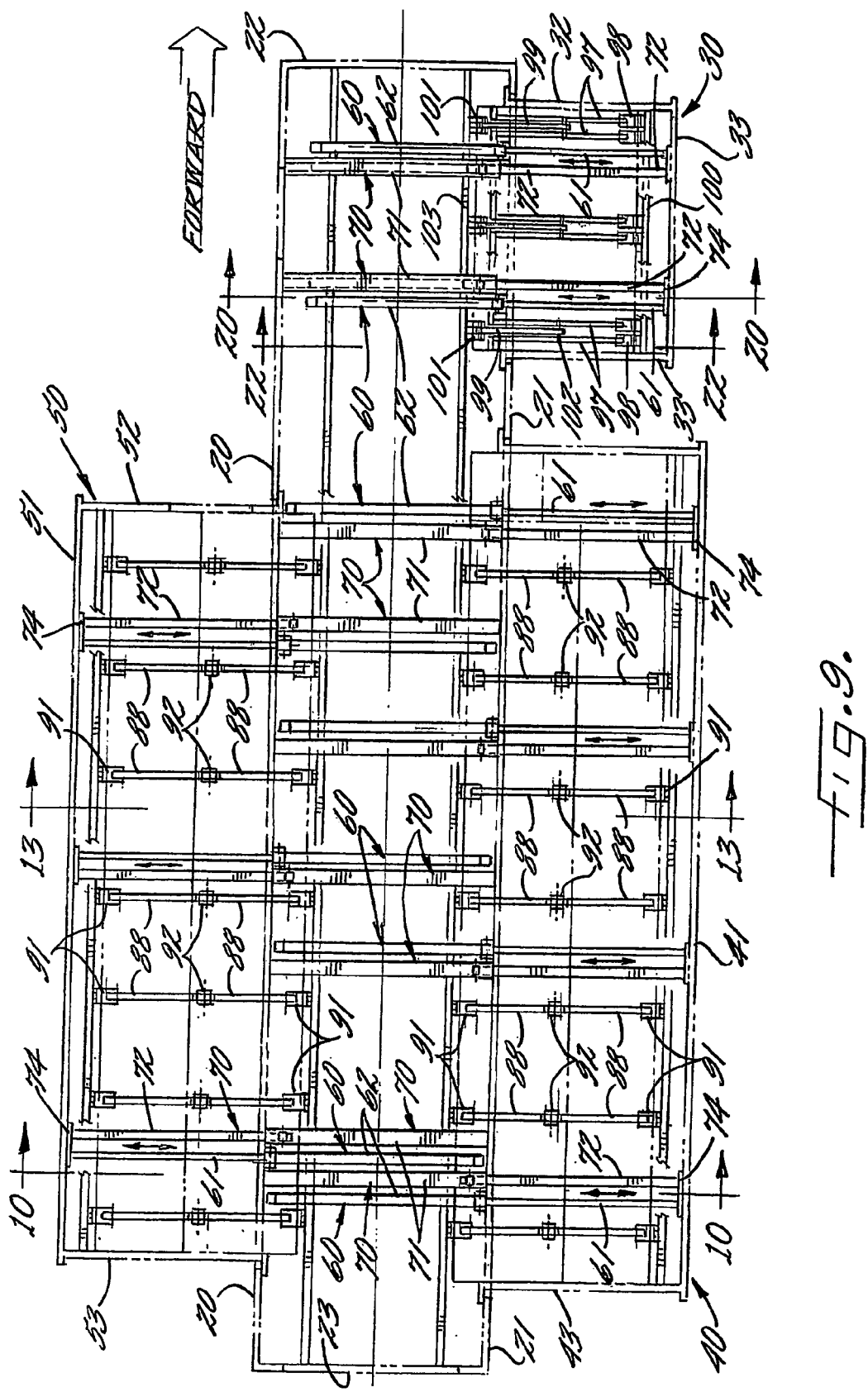

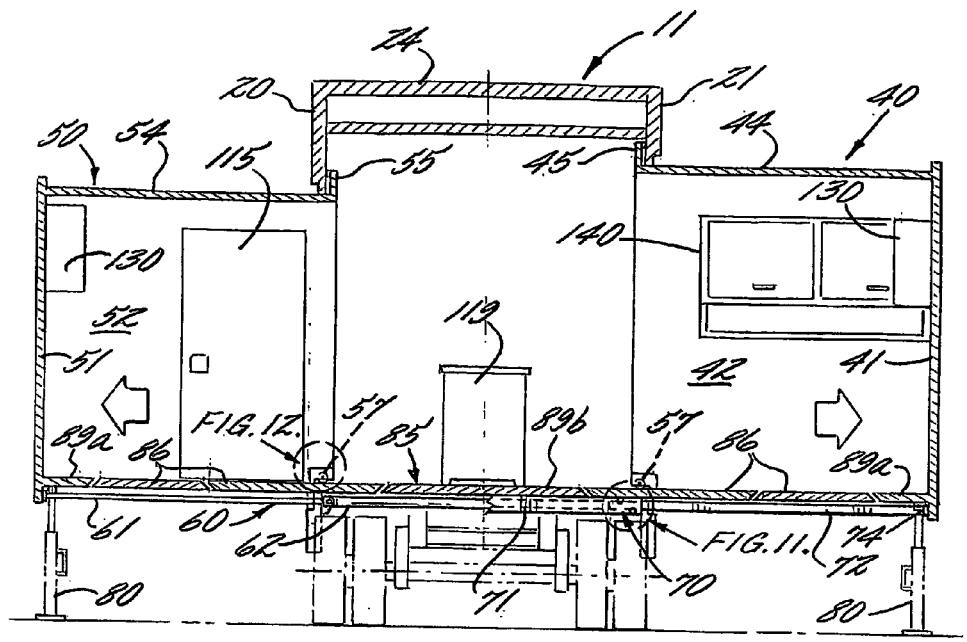
Fig. 10.
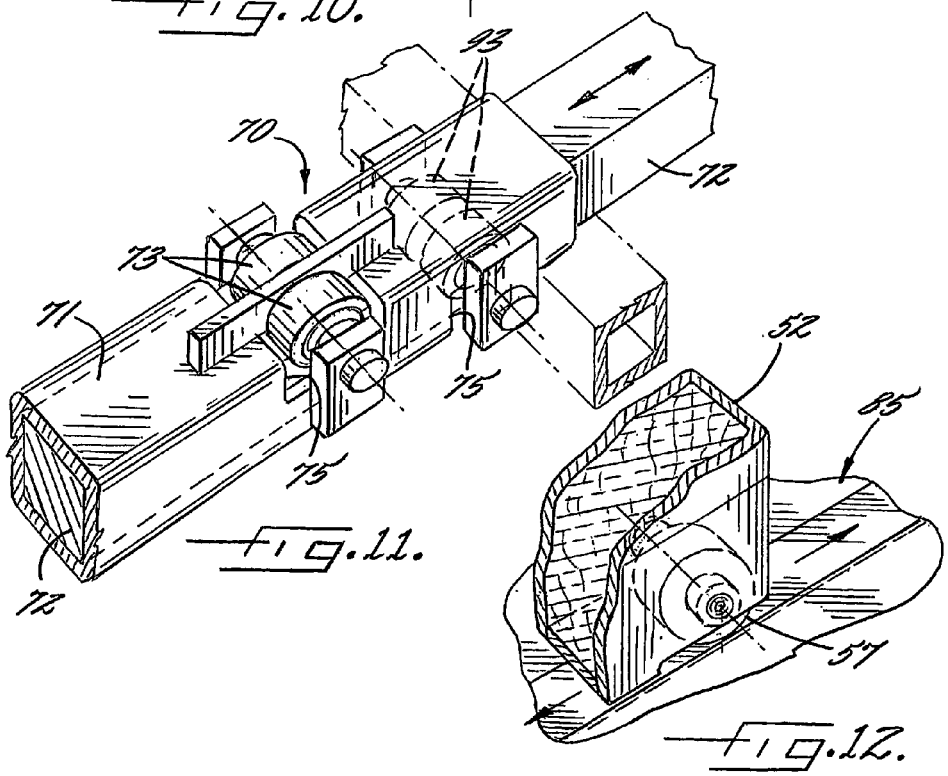
Fig. 11.
Fig. 12.

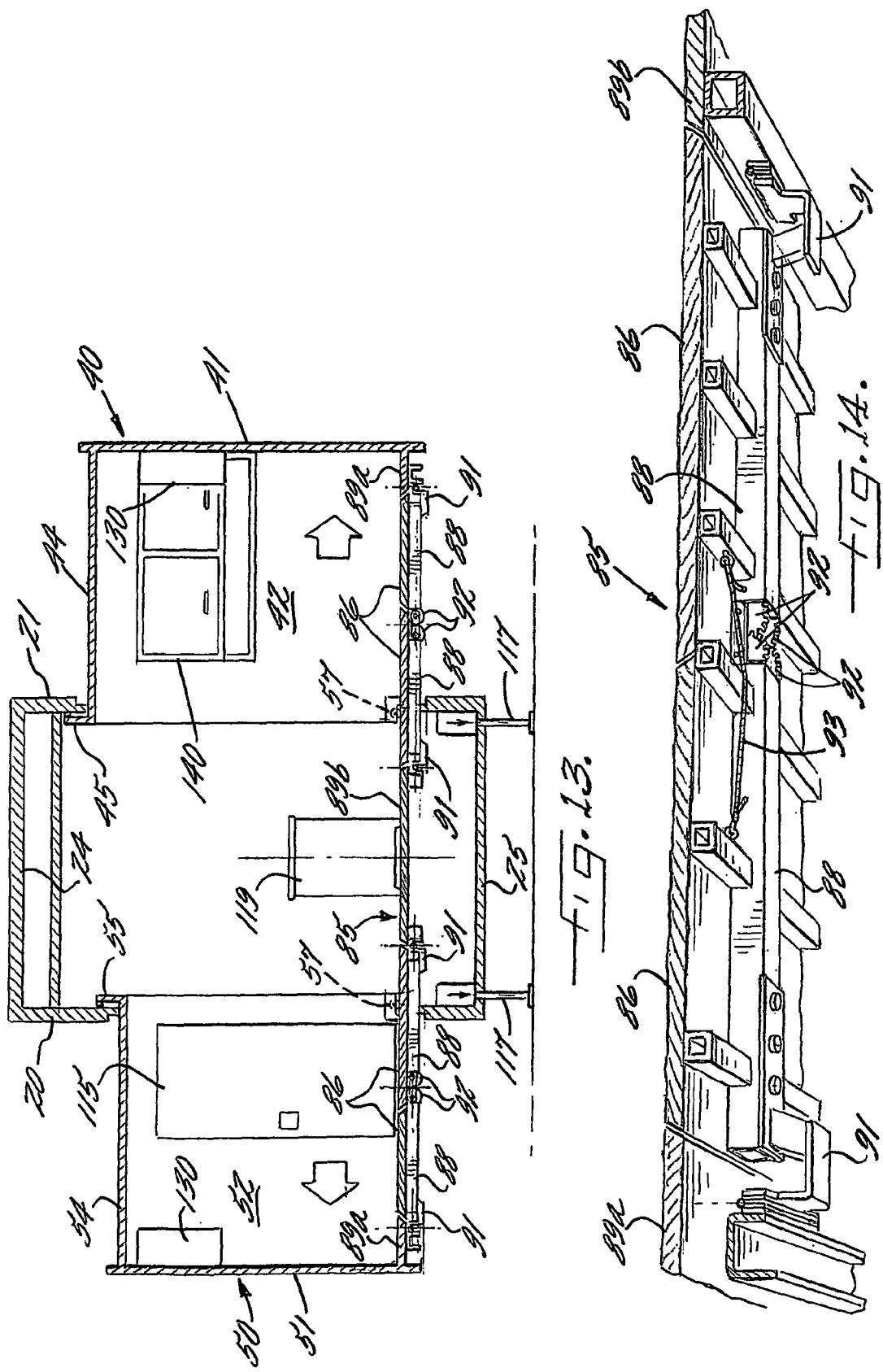

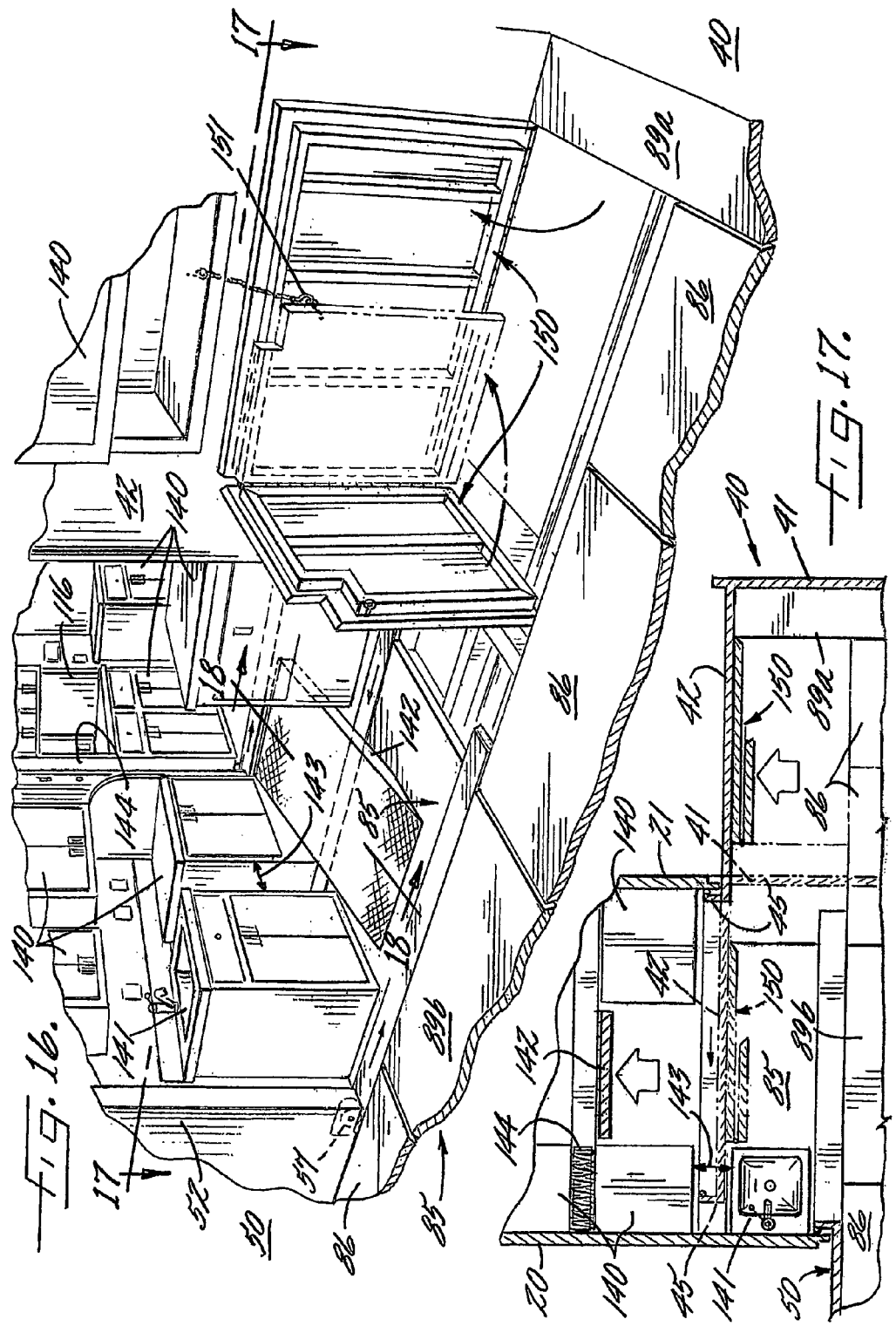

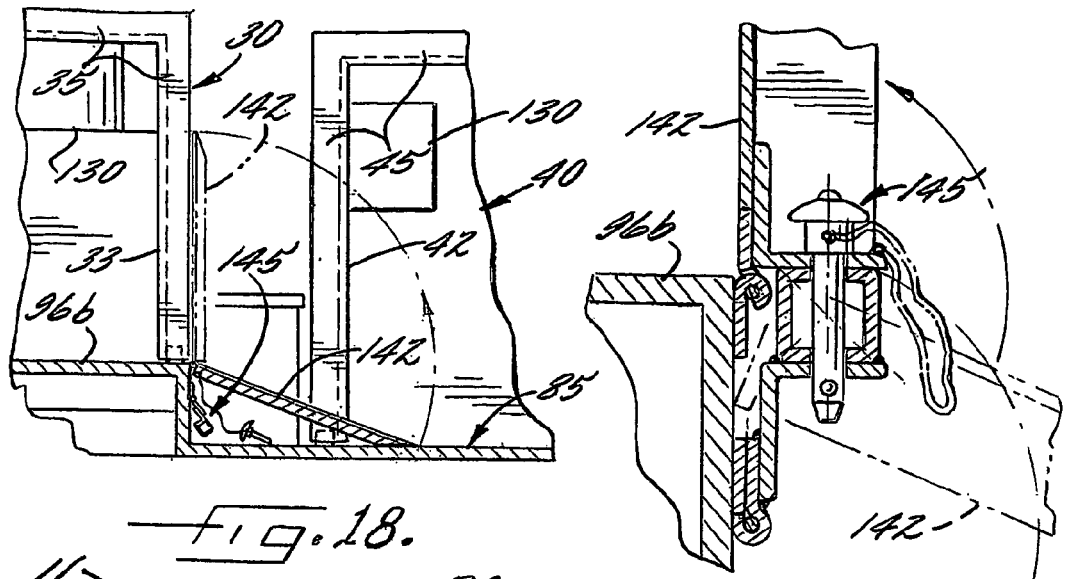
fig. 18.
fig. 19.
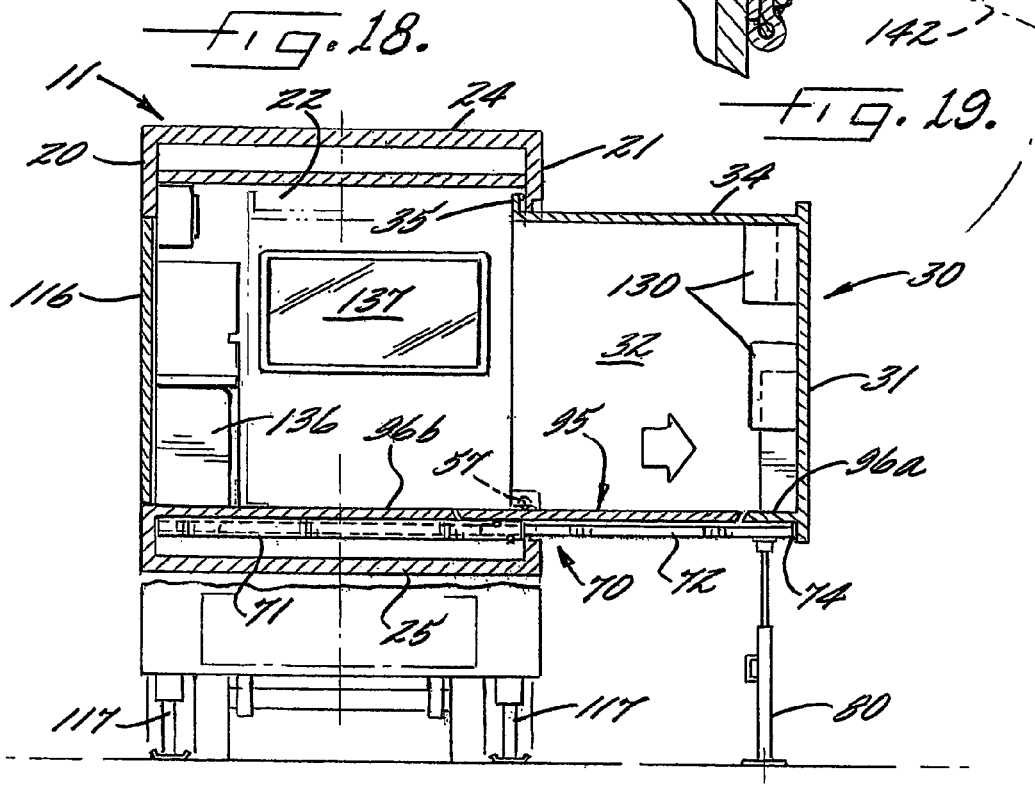
fig. 20.
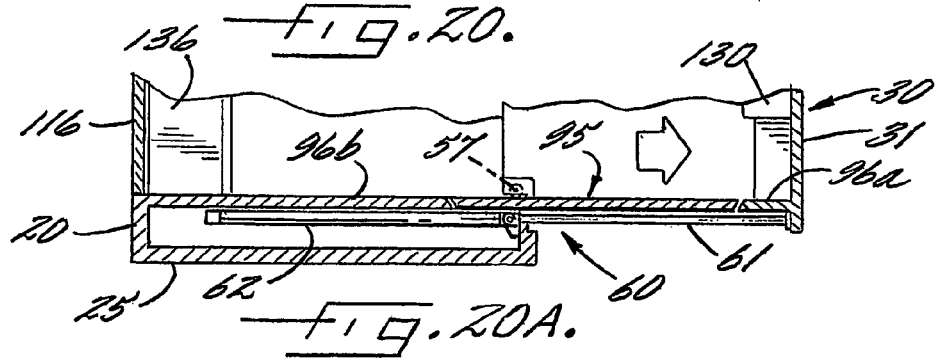
fig. 20A.

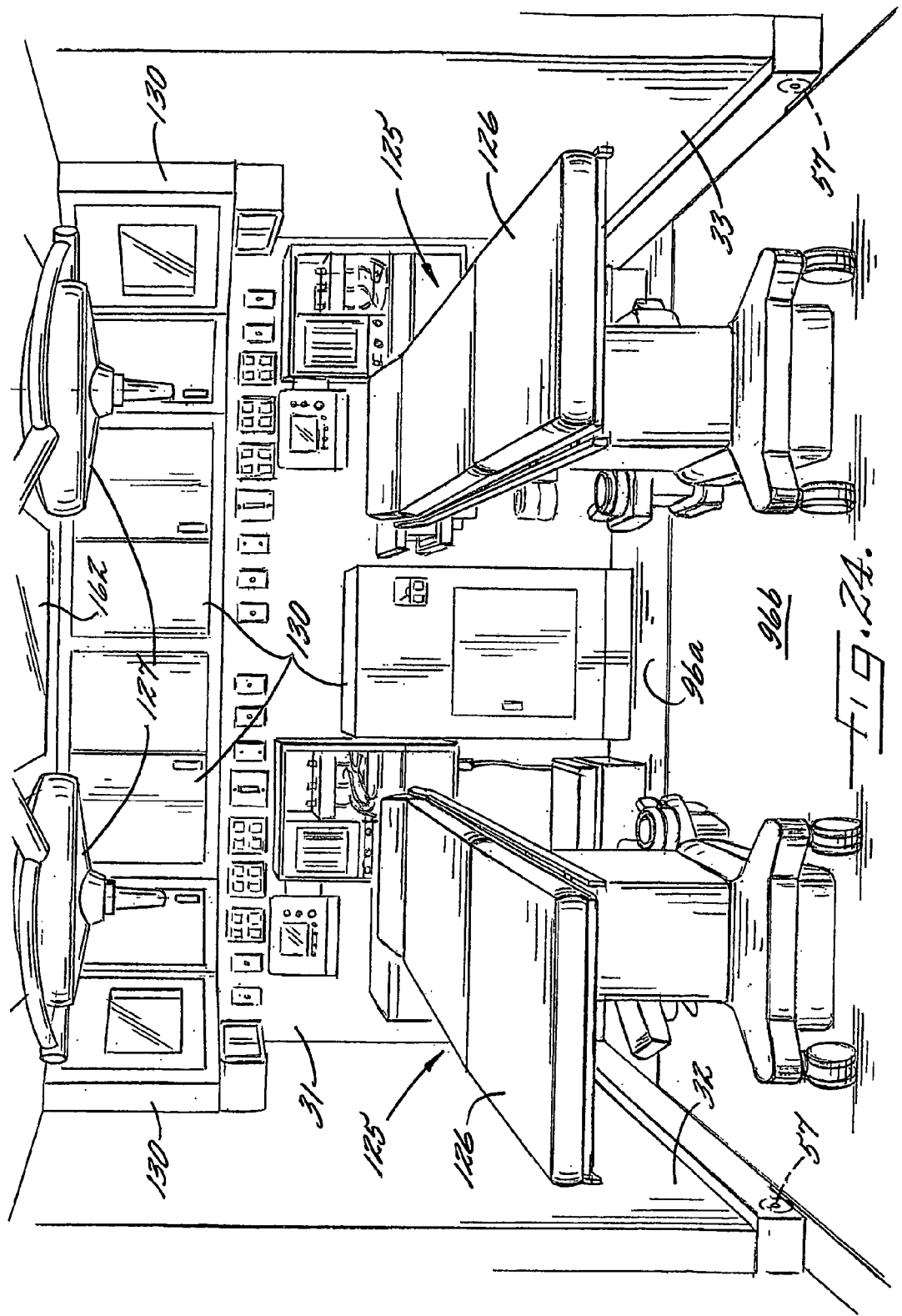

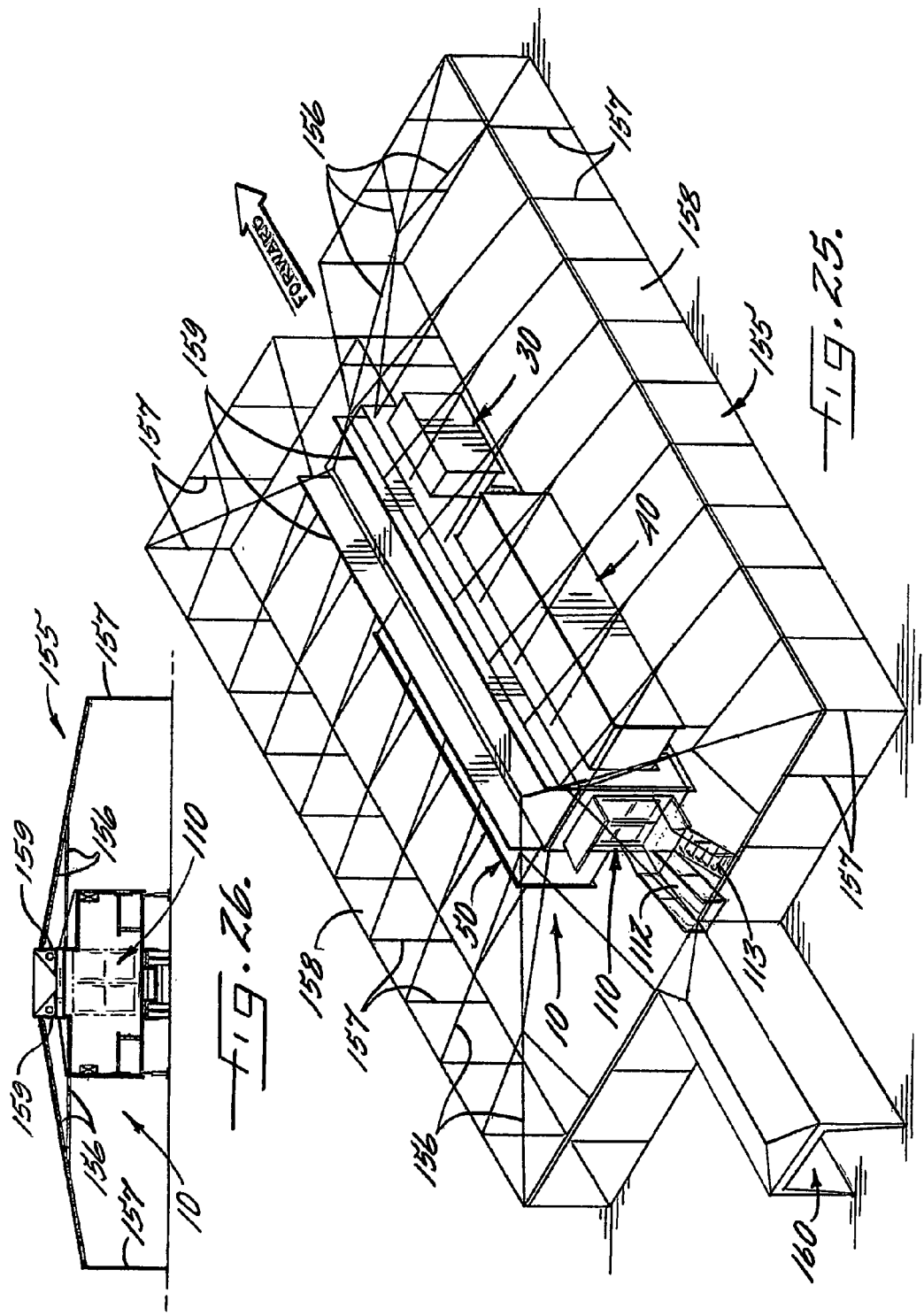

MOBILE MEDICAL FACILITY

FEDERALLY SPONSORED RESEARCH OR DEVELOPMENT

The research underlying this invention was supported in part with funds from United States Department of Homeland Security Grant No. 233-03-0081. The United States Government may have an interest in the subject matter of this invention.

FIELD OF THE INVENTION

The present invention is generally related to medical treatment facilitates and more particularly mobile or portable ones.

BACKGROUND OF THE INVENTION

Disasters happen despite society's best efforts to prevent them. The causes of disasters are many and numerous including, but not limited to, terrorism, weather, and accidents. However a common tragic consequence regardless of the cause is the mass casualties that often results from a disaster. The influx of mass casualties can overwhelm the local medical facilities. Furthermore, the local medical facilities may be compromised from the disaster. For example, a local hospital or hospitals may be on the list of damaged facilities from a destructive hurricane.

Typically, temporary medical facilities are established near the disaster zone or area to reinforce the existing local medical facilities or worse replace them in order to treat the mass causalities. The effectiveness of these temporary medical facilities is heavily dependent on the speed in which the facilities can be established and the capabilities of the facilities once established. The size and condition of the hosting structure or structures for the facility and the supplies, equipment, and personnel available all contribute, among other things, to the capability of that medical facility. A temporary medical facility even with state of the art medical capabilities is of a little help if the facility is not established relatively soon after the disaster to treat the casualties. Likewise, a temporary medical facility established soon after the disaster with limited medical capability is of limited help to the mass causalities.

Past reactions and planning for disasters have produced a variety of temporary medical facilities. For example, the military and civil authorities often use evacuated buildings or other structures to establish these facilities. Existing structures may provide adequate housing and a relatively clean environment for a facility. However existing structures are not always available or the safety of the existing structures may be in doubt in view of the disaster. Also, structures alone do not provide a functional medical facility. Medical personnel, supplies and equipment are still needed. Therefore even in circumstances where existing structures are available, the authorities are still challenged with providing adequate supplies, equipment, and personnel for the facility.

Instead of relying on existing structures for housing, sometimes the housing is shipped or transported to the disaster area along with the supplies, equipment, and personnel. In some cases, portable permanent structures are transported to the disaster area. However these structures typically have either very limited space in which to host the facility or require extensive transportation means to deliver the structure to or near the disaster zone. Furthermore, coordinating for the movement of such structures often requires too much time. In other cases, portable non-permanent or semi-permanent structures are transported in. For example, tents or modular-type buildings can be utilized. Transporting these structures is relatively easier because they can be broken down into parts for shipping. However, once these structures arrive they require substantial set-up time and manpower; time and manpower that often are not available. Furthermore, non-permanent or semi-permanent systems often are not conducive to a clean and controlled environment that is desired for a medical facility.

In light of the foregoing, it is desirable to provide a portable medical facility that can reinforce or help replace the existing local medical facilities after a disaster. In particular it would be advantageous for the portable medical facility to have the capabilities to treat numerous patients including patients in need of urgent care. Also it would be advantageous if the medical facility can be transported to and set up near the disaster area in a short amount of time with minimal personnel. Preferably, transporting of the facility should not require extensive transporting means.

BRIEF SUMMARY OF THE INVENTION

The present invention addresses the above needs and achieves other advantages by providing a mobile medical facility capable of treating numerous patients and being transported over a highway or road without requiring extensive transporting means. In general the mobile medical facility includes a trailer. The trailer defines a floor area and has at least a first and second configuration. In the first configuration, the floor area is reduced to allow for the transporting of the trailer over the public highways. In the second configuration, the floor area of the trailer is expanded and large enough to support numerous beds for treating patients. In some embodiments, the floor area in the second configuration may be at least twice as large as the floor area in the first configuration. For example, the floor area in the second configuration may be approximately 924 square feet and the floor area in the first configuration may be approximately 422 square feet.

The mobile medical facility may also include any one or all of the following: one or more tractors, an awning system, and one or more additional trailers. The tractor or tractors may be used to transport the trailer or trailers to the area in need of an additional medical facility. The awning system may be used to provide an extended protective area adjacent to one of the trailers. Additional trailers may be used to store and transport equipment or provide a rest or sleep area for the medical personnel.

In one embodiment, the present invention provides a trailer for providing a patient care facility. The trailer may include at least one treatment area. Each treatment area defines a floor area and has at least two configurations. In one configuration, the floor area is capable of supporting numerous patient beds and in another configuration the floor area of the treatment area is reduced for transport. In some embodiments, the floor area in one configuration is at least twice as large as the floor area in another configuration.

The trailer may have two treatment areas and a partition for controlling access between the treatment areas. In particular, one treatment area is adapted for providing general care and monitoring for a number of patients and the other treatment area is for providing surgical care for at least one patient. The trailer may also have one or more doors for controlling access in and out the trailer. The trailer should have a generator for providing power, an air filtration system for filtering the air supply in the trailer, one or more light sources, a compressed air supply, a liquid oxygen supply, a heating source, and/or a cooling source.

In another aspect of the invention, the trailer may have one or more slide outs. The slide out or slide outs have more than one position allowing for the different configurations for the treatment areas or the trailer. In one embodiment, the trailer has three slide outs. The combination of two of the slide outs defines one treatment area that is capable of supporting numerous patient beds when the slide outs are in an expanded position. For example, the treatment area may have twelve patient beds. The third slide out defines another treatment area capable of supporting a plurality of operating tables. For example, this treatment area may have two operating tables. The trailer of the present invention may also have a plurality of hydraulic rams for moving the slide outs between positions.

The present invention has several advantages. As shown in the illustrated embodiment, the present invention provides a trailer that is easily transported. The, slide outs of the trailer allow the trailer to quickly expand to a medical facility with a robust floor area to treat several patients. The medical facility is capable of treating a wide range of conditions or injuries including, but not limited to, operative procedures required for live-saving hemorrhage control, emergent airway support, advanced life support for cardiac arrest, post-resuscitation and critical care. If necessary, the awning system provides an effective way of adding additional capacity. The use of additional trailers allows for the mobile medical facility to carry a large cache of supply and equipment. The mobile medical facility is capable of being completely self-sufficient and may include generator power, running portable water, biohazardous waste disposal, lighting, heating, air conditioning and HEPA air filtration. The mobile medical facility has application in a number of different environments. In the event of terrorist incident involving a weapon of mass destruction, the mobile medical facility can be brought to the scene to either ease the burden on the local medical facilities or be used to treat patients on scene if the medical facilities become overwhelmed or destroyed. The facility may also be deployed to a shelter to provide comprehensive medical care for isolated or quarantined patients should an infectious disease outbreak occur.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a perspective view of one embodiment of the present invention, wherein the trailer is in a first configuration for transport;

FIG. 2 is a side view of the embodiment in FIG. 1;

FIG. 5 is a view of the interior of the trailer from the top wherein the trailer is in the second configuration;

FIG. 6 is the same view of FIG. 5 wherein the trailer is in the first configuration;

FIG. 7 is a side view of the interior of the driver side of the trailer taken along line 7-7 of FIG. 5;

FIG. 8 is a side view of the interior of the passenger side of the trailer taken along line 8-8 of FIG. 5;

FIG. 9 is a view of the bottom of the trailer from the top wherein the trailer is in the second and expanded configuration;

FIG. 10 is a rear view of the trailer taken along line 10-10 of FIG. 9;

FIG. 11 is an expanded view of a cantilever beam and sleeve that is shown in FIG. 10;

FIG. 12 is an expanded view of a roller area on the bottom of a side end that is shown in FIG. 10;

FIG. 13 is a rear view of the trailer taken along line 13-13 of FIG. 9;

FIG. 14 is a cut-out perspective view of the bottom of floor sections;

FIG. 16 is a cut-out perspective view of the area between the first treatment area and the second treatment area;

FIG. 17 is another view of FIG. 16 taken along line 17-17 of FIG. 16;

FIG. 18 is view of the ramp between treatment areas taken along line 18-18 of FIG. 16;

FIG. 19 is an expanded view of the locking mechanism of the ramp shown in FIG. 18;

FIG. 20 is a rear view of the trailer taken along line 20-20 of FIG. 9 wherein the slide out for the second treatment area is expanded to the second configuration;

FIG. 20A is cut-out side view of the floor of the slide out in FIG. 20 when expanded;

FIG. 23 is a rear perspective view of the first treatment area of the trailer in the second configuration;

FIG. 24 is a perspective view of the second treatment area of the trailer in the second configuration;

FIG. 25 is a perspective view of the awning system and trailer of the present invention; and FIG. 26 is a cross-sectional view of FIG. 25.

DETAILED DESCRIPTION OF THE INVENTION

Figure 3:
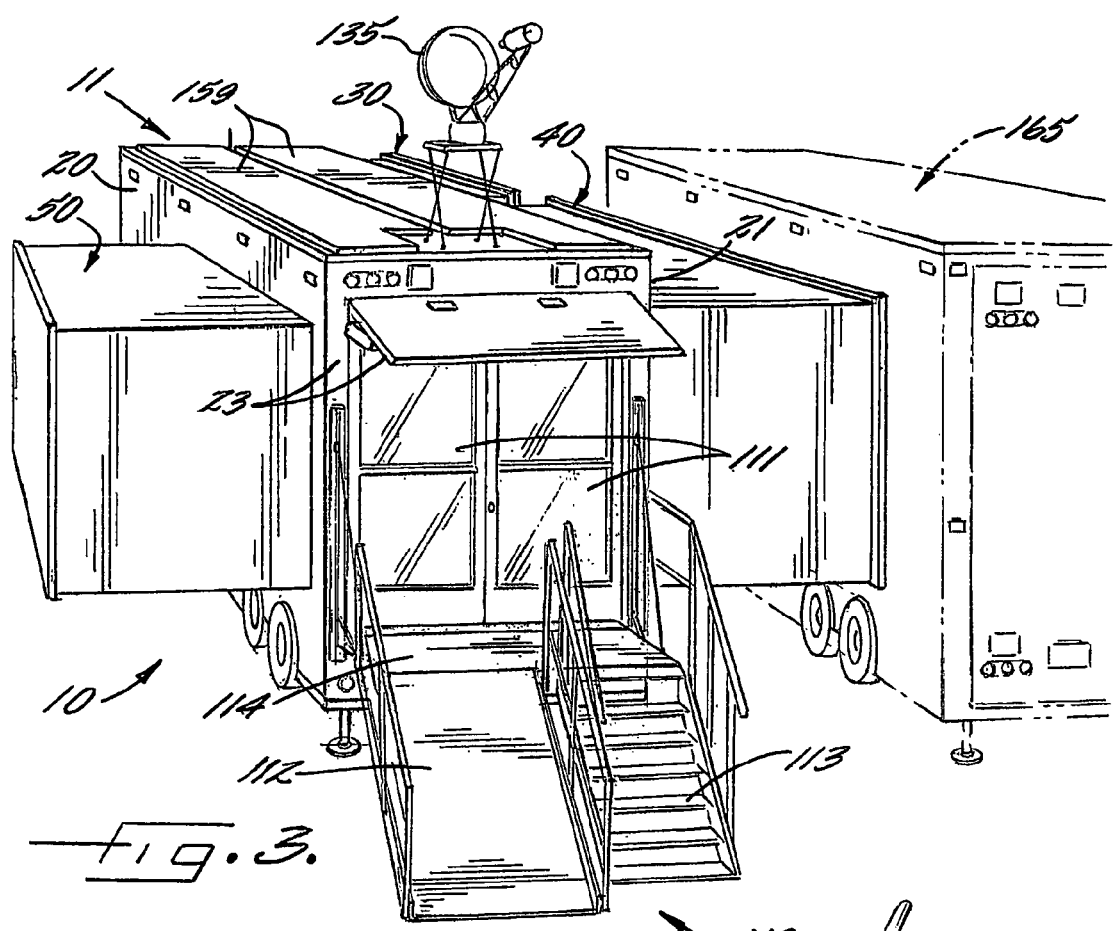
FIG. 3 is another perspective view of the present invention from the rear of the trailer wherein the trailer is in a second and expanded configuration.

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

The present invention provides a mobile medical facility 10 capable of being transported over roadways and treating a plurality of patients suffering from a range of conditions or injuries. In general, and as shown in FIGS. 1 and 2, the mobile medical facility 10 includes a trailer 11. The trailer 11 has at least a first and second configuration. In the first configuration, the outer size and shape of the trailer 11 is configured to allow for the easy transportation of the trailer 11 preferably by a tractor 12 over roadways. In the second configuration, the trailer 11 is configured to provide a large enough floor area to support the treatment of a plurality of patients.

More specifically, in the first configuration the outer shape of trailer 11 is generally rectangular and includes two substantially planar and opposing side walls 20, 21 extending between a first end 22 and a second end 23, a roof surface 24 and an undersurface 25. Although the size and shape of the trailer 11 in the first configuration may vary between embodiments, it is preferable that the size and shape of the trailer 11 are configured to allow the passage of the trailer 11 through the common limitations found on the public highways such as the width and height of bridges and tunnels. For example and not as a limitation, the trailer 11 may be approximately 53 feet long, 8 feet wide, and 13 feet tall in the first configuration and define a first floor area that is approximately 422 square feet.

In the second configuration, the trailer 11 is expanded and provides additional floor area capable of supporting a plurality of patient treatment bays 120. The trailer 11 is expanded by the use of at least one or more slide outs. Although the present invention may employ a various number of slide outs, the trailer 11 in the illustrated embodiment has three slides outs 30, 40, 50. Referring to FIGS. 1 and 2, two slide outs 30, 40 are on the passenger side of the trailer 11 and one slide out 50 is on the driver side. For example purposes and not as limitation, the trailer's floor area in the second configuration, referred to herein as the second floor area, may be approximately 924 square feet.

Each of the slide outs 30, 40, 50 generally includes an outer wall 31, 41, 51, two side ends 32, 33, 42, 43, 52, 53, and a ceiling 34, 44, 54. Each slide out 30, 40, 50 is configured to extend in and out of an opening in one of the side walls 20, 21 of the trailer 11. In particular, in the first configuration and as shown in FIG. 1 and 2, the outer wall 31, 41, 51 of a slide out 30, 40, 50 may be substantially planar with one of the side walls 20, 21 of the trailer 11 and the side ends 32, 33, 42, 43, 52, 53, and ceiling 34, 44, 54 of that slide out 30, 40, 50 is substantially contained between the side walls 20, 21 of the trailer 11. In the second configuration and as shown in FIG. 5, the outer wall 31, 41, 51 of each slide out 30, 40, 50 may extend outwardly from the side wall 20, 21 of the trailer 11. By extending one of more of the slide outs 30, 40, 50, the trailer 11 expands its floor area. Each slide out 30, 40, 50 defines part of a treatment area. For example, the two larger and opposing slide outs 40, 50 of the illustrated embodiment when fully extended or deployed together form part of a first treatment area as further described below. The third slide out 30 nearest the forward end 22 of the trailer 11 as shown in FIGS. 1 and 5 when expanded forms part of a second treatment area as further described below. For example purposes only and not as a limitation, the floor area of the first treatment area may be approximately 765 square feet and the floor area of the second treatment area may be approximately 137 square feet.

In general, the side ends 32, 33, 42, 43, 52, 53 of the slide outs 30, 40, 50 are substantially perpendicular to the side walls 20, 21 of the trailer 11. In the illustrated embodiment and as shown in FIGS. 10 and 12, one or more rollers 57 may be affixed to the bottom of each side end 32, 33, 42, 43, 52, 53. The rollers 57 facilitate the sliding of the side end 32, 33, 42, 43, 52, 53 over a floor 85 of the trailer 11 when the slide out 30, 40, 50 is moving between configurations.

At the distal edge away from the outer wall 31, 41, 51, the side ends 32, 33, 42, 43, 52, 53 and the ceiling 34, 44, 54 of each slide out 30, 40, 50 may have a sealing flange 35, 45, 55 as shown in FIGS. 5, 10 and 20. The sealing flange 35, 45, 55 extends generally perpendicular from the ceiling 34, 44, 54 and side ends 32, 33, 42, 43, 52, 53 and generally parallel with the side walls 20, 21 of the trailer 11. The sealing flange 35, 45, 55 facilitates the sealing of the trailer 11 when the trailer 11 is in the second or expanded configuration.

Figure 15A:
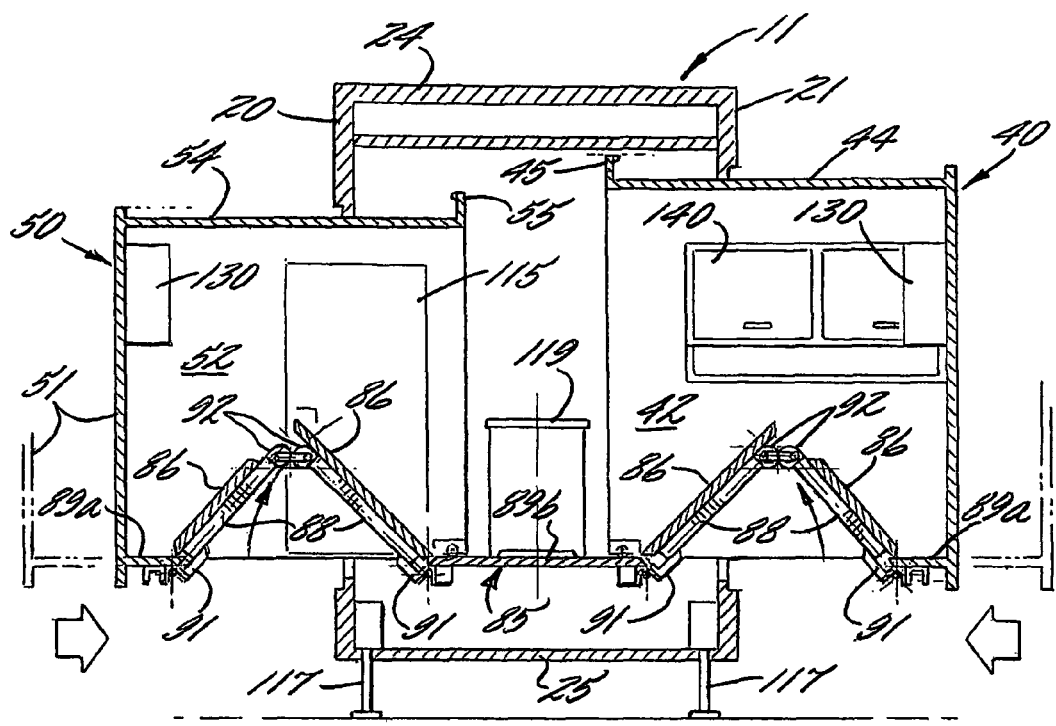
FIG. 15A is a rear view of FIG. 13 wherein the slide outs are between the first and second configuration.
Figure 15B:
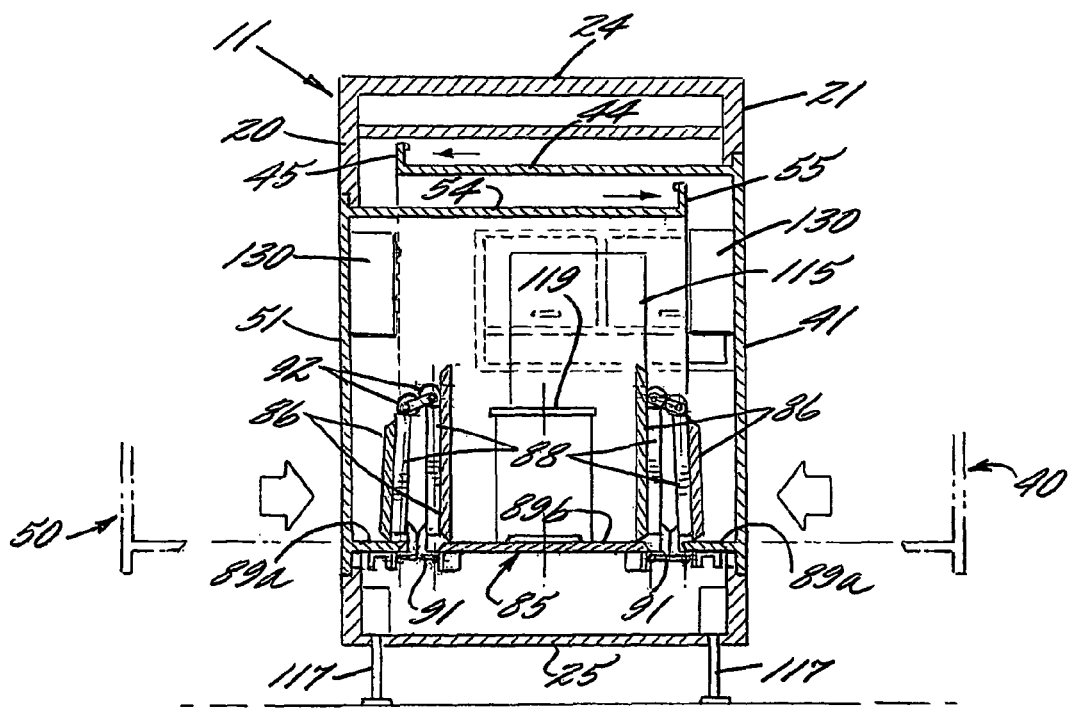
FIG. 15B is a rear view of FIG. 13 wherein the slide outs are in the first or retracted configuration.

Advantageously, the side ends 42, 43, 52, 53 of the two opposing and larger slide outs 40, 50 are positioned to offset one another to allow these two slide outs 40, 50 to be substantially contained between the side walls 20, 21 of the trailer 11 at the same time. This is best seen in FIGS. 5 and 6. Similarly, the ceilings 44, 54 of these two slide outs 40, 50 are positioned to offset one another to allow both slide outs 40, 50 to be in a retracted position for the first configuration without interference from the other. This is best seen in FIGS. 15A and 15B.

In another aspect of the present invention, the trailer 11 also includes a floor 85 having several sections. The sections are adjustable to accommodate the moving of the slide outs 30, 40, 50 between configurations. For example, the floor area extending between the two outer walls 41, 51 of the two opposing and larger slide outs 40, 50 have seven sections, four of which fold up when these two slide outs 40, 50 are in the first configuration. In particular and as best seen in FIG. 13 through 15B, two sections 86 of the floor 85 on either side of the trailer 11 fold up to approximately 90 degrees in the first configuration. These two sections 86 flatten out with the movement of the slide outs 40, 50 to the second configuration.

Referring to FIG. 14, a plurality of latitudinal supports 88 is attached to each folding floor section 86. Each latitudinal support 88 has two outer ends, one end adjacent to a non-folding floor section 89a, 89b and one end adjacent to the another folding floor section 86. A U-shaped bracket 91 connects the end adjacent to the non-folding floor section 89a, 89b to that non-folding floor section 89a, 89b. The U-shaped bracket 91 allows that folding floor section 86 to rotate or fold upwardly and substantially perpendicular to that non-folding section 89a, 89b without interference from that non-folding floor section 89a, 89b. A pair of stationary gears 92 is affixed to the other end of the latitudinal support 88 adjacent to another folding floor section 86. This pair of stationary gears 92 engages a similar pair of gear 92 that corresponds to the adjacent folding floor section 86. When the slide out 40, 50 is moved inward, the teeth on the gears 92 facilitate the rotating or folding of these two floor sections 86. In order to inhibit the over-extension of the floor sections 86 in the second configuration wire cables 93 may be affixed between the folding floor sections 86 as shown in FIG. 14.

Figures 21, 22A, 22B:
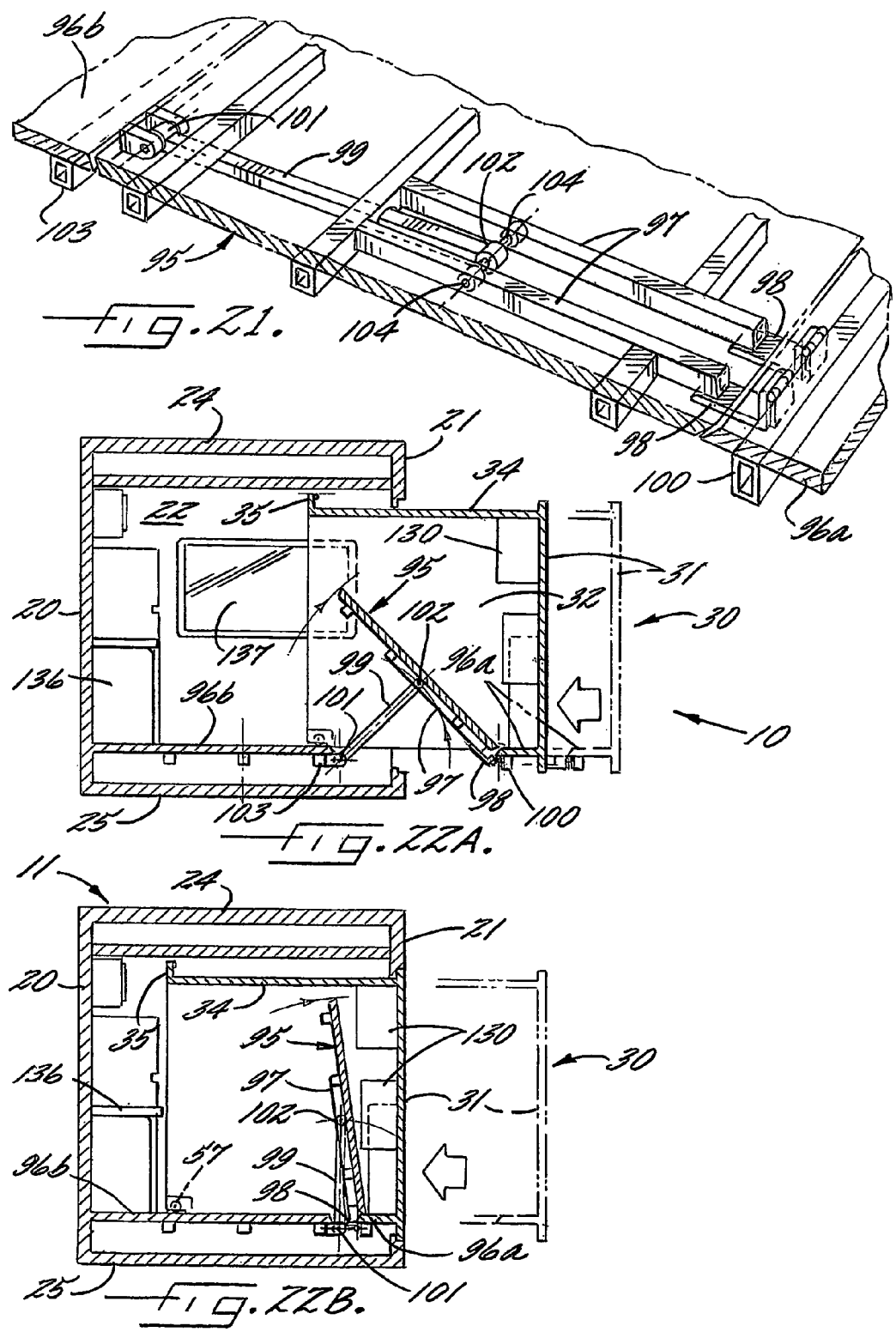
FIG. 21 is a cut-out perspective view of the floor of the slide out in FIG. 20 when expanded.
FIG. 22A is a rear view of the trailer taken along line 20-20 of FIG. 9 wherein the slide out for the treatment area is between the first and second configuration.
FIG. 22B is a rear view of the trailer taken along line 20-20 of FIG. 9 wherein the slide out for the treat is in the first or retracted configuration.
Figure 73:
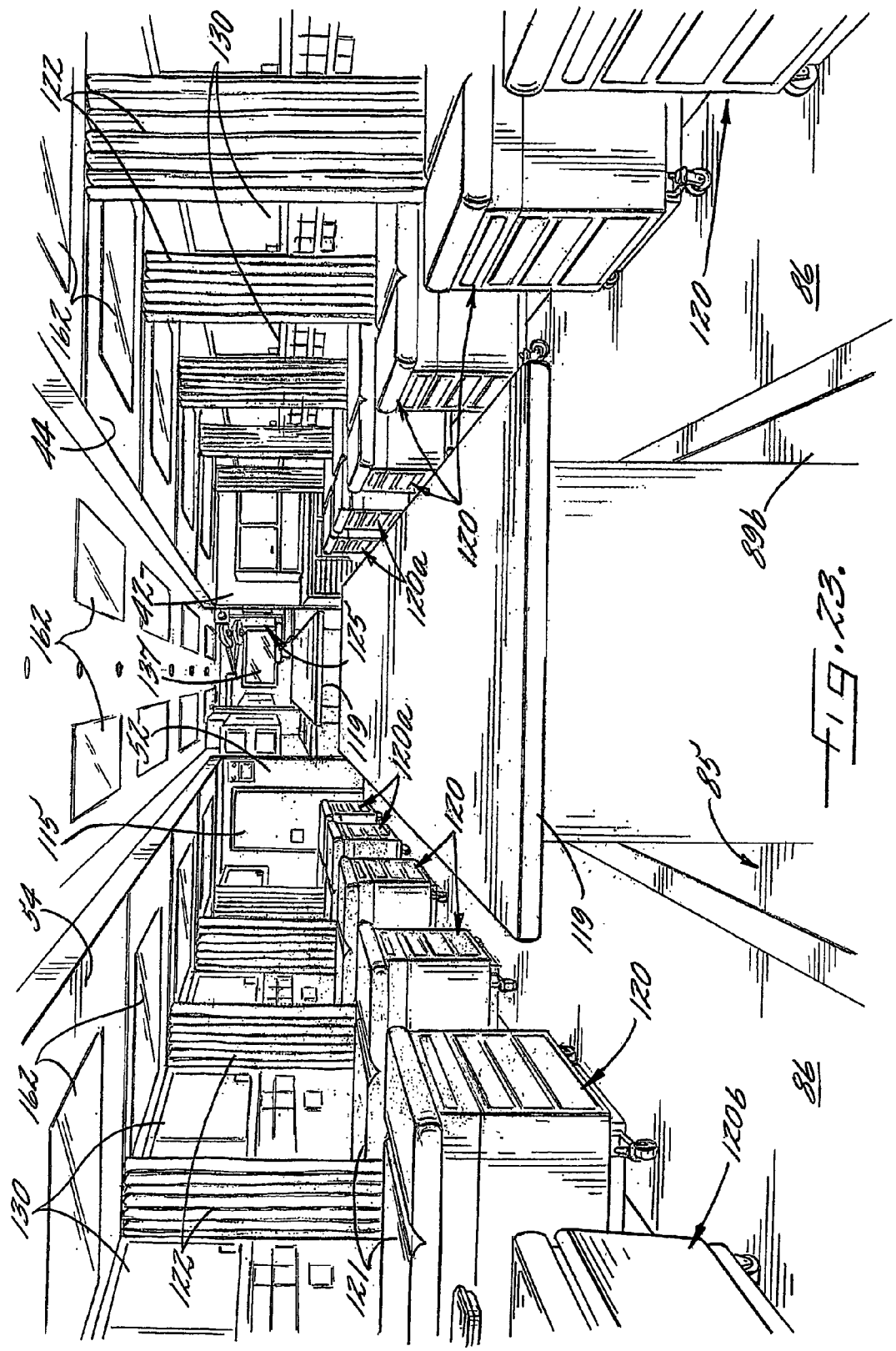

The floor area between the outer wall 31 of the third slide out 30 and the far side wall 20 of the trailer 11 may be configured differently than the floor area between the two larger slide outs 40, 50. For example, this floor area in general may be elevated compared to the rest of the floor in order to accommodate the tractor 12 that may pull the trailer 11. Also, as best seen in FIGS. 20 through 22B, the floor area may have only three floor sections of which one section 95 rotates or folds. Multiple pairings of substantially parallel members 97 are attached to the underside of the folding floor section 95, as shown in FIG. 21. One end of each member 97 is attached by a pivotal bracket 98 to a longitudinal support 100 that is attached to the underside of the non-folding floor section 96a adjacent the outer wall 31 of the slide out 30. A plurality of struts 99 is attached to the non-folding floor section 96b distal from the outer wall 31 of the slide out 30 and the parallel members 97. In particular, each strut 99 has a first end 101 and a second end 102. The first strut end 101 is rotatably attached to the non-folding floor 96b section via a bracket mounted to a longitudinal support 103 attached to that non-folding floor section 96b. The second strut end 102 is rotatably attached to a rod 104 that is supported by a pair of the parallel members 97. When the slide out 30 moves inward the folding floor section 95 rotates about the second strut end 102 and the strut 99 rotates about its first end 101 as shown in FIG. 22A.

Rotating or folding one or more floor sections is only one manner in which to provide a floor for the trailer 11 and thus the treatment areas. For example, portions of the floors may slide over each other rather than rotate. However, the folding floor sections are preferred. Rotating floor length 90 degrees is an effective method of compacting that overall floor length for transportation. The folding sections allow for the floor area of each treatment area to be on one level when extended. Also, the non-folded floor sections provide space that can maintain or support equipment or fixtures in both the first and second configuration. For example, the center non-folding floor section 89b between the two larger slide outs 40, 50 may have one or more medical personnel stations 119 consisting of a desk structure with storage capacity and a work surface. The desk structure or structures may remain in place even when the floor sections are folded up. Similarly the non-folding floor sections adjacent to the outer walls 88a, 96a allow for cabinetry for storage 130 and other equipment to run along the outer walls 31, 41, 51 without requiring their removing when the floor sections are folded up.

Figure 4:
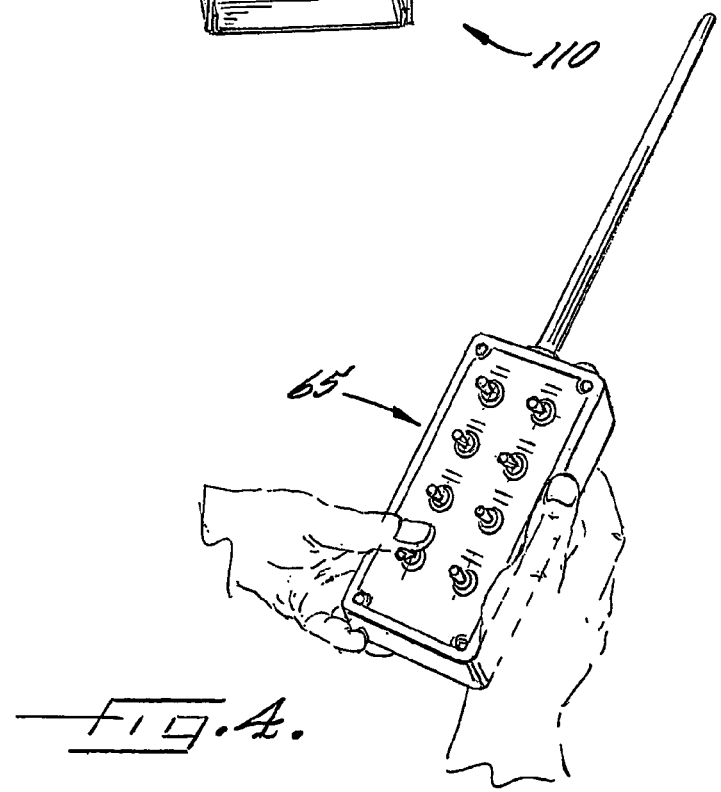
FIG. 4 is a perspective view of a remote control device for moving the trailer between configurations.

As shown in FIG. 9, the trailer 11 may include a plurality of hydraulic rams 60 for moving the slide outs 30, 40, 50 between configurations or positions. Each ram 60 comprises a piston 61 and a cylinder 62 in which the piston 61 moves through a gland at one end. Each cylinder 62 is located between the center and non-folding floor section 89b, 96b and the undersurface 25 of the trailer 11. A distal end 63 of the piston 61 is affixed to an outer wall 31, 41, 51 of a slide out 30, 40, 50 underneath the floor 85. When the piston 61 is pushed out of the cylinder 62 by the hydraulic pressure, the piston 61 pushes out the slide out 30, 40, 50. In some embodiments, the operations of the rams 60 may be controlled remotely by control device 65, such as the one shown in FIG. 4.

Although the illustrated embodiment employs hydraulic rams 60 to move the slide outs 30, 40, 50 between the first and second configurations, one in the art would appreciate the numerous methods and devices that may be included in the present invention to move the slide outs 30, 40, 50. For example, the slide outs 30, 40, 50 may be moved between configurations with a gear system such as a rack and pinion assembly driven by either hand cranks and/or electric motors.

The trailer 11 may also include a plurality of structural members for supporting the slide outs 30, 40, 50 when they are deployed in the second configuration. For example purposes only and not as a limitation, cantilever beams and jack-supports may be used. More specifically, as best seen in FIGS. 9 through 11, the trailer 11 may have a plurality of extendable cantilever supports 70. Each support includes a sleeve 71, a beam 72, and one or more rollers 73. The sleeve 71 is mounted underneath one of the non-folding and center floor sections 89b, 96b, generally in parallel and proximate to one of the hydraulic rams 60. The sleeve 71 is configured to contain some or all of the entire beam 72. One end 74 of the beam 72 is affixed to the outer wall 31, 41, 51 of a slide out 30, 40, 50 underneath the floor 85. When the slide out 30, 40, 50 extends out and away from the center of the trailer 11 the beam 72 extends out with it and slides out of the sleeve 71. Conversely, when the slide out 30, 40, 50 retracts back to the first configuration the beam 72 slides back into and along the sleeve 71. The rollers 73 are mounted on the sleeve 71 and engage the beam 72 through openings 75 in the sleeve 71 to facilitate the movement of the beam 72 in and out of the sleeve 71.

The trailer 11 may also include a plurality of jack supports 80 for additional support to the slide outs 30, 40, 50 when extended. As shown in FIGS. 10 and 20, the jack supports 80 are placed proximately underneath the outer wall 31, 41, 51 of the slide outs 30, 40, 50 and are configured to engage the end 74 of a beam 72. One in the art would appreciate the numerous jacks that may be employed with this invention including but not limited to hydraulic or scissors-type.

As stated above, when the two larger slide outs 40, 50 are fully deployed they define part of a first treatment area intended for serious ill or injured victims who may require definitive care or constant monitoring. The third slide out when deployed defines a second treatment area that functions as an operating room.

The first treatment area provides for a plurality of patient treatment bays 120 as shown in FIGS. 5 and 23. Some of the patient bays 120 may be designated for general care and others for critical care. For example, the bays 120a closest to the second treatment area may be considered for patients in need of critical care. Each bay 120 may include a patient bed 121 or chair 123 and additional equipment or hardware. The patient bed 121 may be the typical "medical office" type that can be seated firmly on the floor 85 and include a thick mattress. These beds 121 also have storage drawers located under the mattress on the sides. Paper rolls are located at the head of each bed 121 to be used as sheets. The utility of this is important for this can be changed quickly between patients, it is easily disposed of, and it negates the requirement for linen. Individual patient treatment bays 120 may be segregated for privacy by dividing curtains 122. The second treatment area functions as a operating room and may provide one or more operating stations 125 as shown in FIG. 24. Each station 125 may include an operating room table 126 and an additional equipment or hardware, including adjustable overhead lighting 127.

In the illustrated embodiment the first treatment area supports twelve patient treatment bays 120 of which four are designated for critical care 120a and one is configured to be a dental care station 120b. And the second treatment area supports two operating stations 125. However one in the art would appreciate the numerous variations this present invention may employ regarding the number, combinations, and designations of the treatment bays 120 and operating stations 125.

The general area between the first and second treatment areas may provide additional storage areas 140 and one or more sinks 141 as shown in FIGS. 16 and 17. In the embodiments having floors at different levels between the treatment areas, a ramp 142 may be used as illustrated to assist personnel and patients. The storage areas 140 and sink 141 may have a recess 143 configured to receive a side end 42 of one of the slide outs 40. Also, the ramp 142 may be rotatable such that it can be rotated to a general perpendicular position to avoid interfering with the side end 42 when it moves to a retracted position as shown in FIG. 18. FIG. 19 illustrates an example of a pin-lock mechanism 145 that may be used to hold the ramp 142 in its perpendicular position. A floor section 150 adjacent the side end 42 of the slide out 40 may be folded to compact the floor length between that floor area adjacent the side end 42 and the floor area near the sink 41 for the first configuration. This floor section 150 may be folded manually and held against the side end 42 by a hook 151 as best seen in FIGS. 16 and 17. The trailer 11 may also include a partition 144 near or on the top of the ramp 142 and capable of extending across the width of the trailer 11 for controlling movement between the first and second treatment area. For example purposes only and not as a limitation, the partition 144 may be a folding glass door. Also, due to the amount of storage available in this general area, in some embodiments, this area may be used as a pharmacy.

The trailer 11 may also include one or more doorways for entering and leaving. For example and as shown in FIG. 3, the second end 23 of the trailer 11 may define one or more doors 111 and serve as a main entrance 110. As shown in FIGS. 3 and 8, a ramp 112 and/or stairs 113 may be used to assist people with reaching the entrance 110. Furthermore, as shown in FIG. 7, a hydraulic lift 114 may be attached to the second end 23 to facilitate the movement of equipment in and out of the trailer 11. Additional doors may be defined by a side end 32, 33, 42, 43, 52, 53 of a slide out 30, 40, 50 or a side wall 20, 21 of the trailer 11. According to the illustrated embodiment, a second door 115 is located in a side end 52 of the only slide out 50 on the driver side. And a third door 116 is located on the driver's side wall 20 opposite from the smaller slide out 30. These additional doors 115, 116 may also use ramps 112 or stairs 113 as best shown in FIG. 5.

The trailer 11 may also include one or more hydraulic legs 117 for leveling and/or stabilizing the trailer 11 and thus the floor 85 during the second configuration. According to the illustrated embodiment the trailer 11 has four hydraulic legs 117 located proximate to each corner of the trailer 11 and two additional legs 117 more to the center of the trailer 11 along the side walls 20, 21. In operation, each leg 117 extends down from the undersurface 25 and engages the ground. In order to level the trailer 11, the legs 117 may exert different pressure against the ground to achieve the desired leveling. In some embodiments, the remote control device 65 used to operate the hydraulic rams 60 and shown in FIG. 4 may also operate the hydraulic legs 117.

The trailer 11 may also include power generation, running potable water, biohazard waste disposal, lighting 162, heating, air conditioning and HEPA air filtration for the treatment areas. Furthermore, as part of air filtration, the trailer 11 may include an overpressure air system that maintains the air pressure inside the trailer 11 at a high level than the air pressure of the air outside the trailer 11 to control the flow of air into the trailer 11. As shown in FIGS. 7, 8, 23, and 24, supplies may be stored in overhead cabinets and/or fixed cabinets 130 in each treatment bay 120 and each operating station 125. Monitoring and resuscitation equipment is fixed mounted in the appropriate treatment areas. The layouts are designed to minimize the time between setup and treatment of casualties. Oxygen, air suction, and electricity are piped or wired to all patient treatment bays 120 and operating stations 125. Medical personnel workstations 119 are located to maximize viewing and monitoring of all patients and provide work areas for charting and other paperwork duties. Telephone and data connections are located in the medical personnel workstation 119. Computers are connected via a server mounted onboard the trailer 11.

The trailer 11 may further include a satellite communication system for providing high-speed communication for the medical facility 10. The satellite communication system may have, among other things, a satellite dish 135, a receiver/processor 136, and one or more monitors 137. In general, the communication system provides a real-time video and audio communication link between the mobile medical facility 10 and other health or government facilities such as local EMS or emergency operations centers. For example, the communication system allows for patient health records or other information to be sent to and from the mobile medical facility 10. The satellite communication system may also provide the mobile medical facility 10 with telemedicine capabilities. For example, the medical personnel in one of the operating stations 125 may communicate via a monitor 137 located on the first end 22 with remotely located medical personnel for assistance with the treatment of a patient.

Oxygen and suction ports with all piping for such may be located between an interior wall and the outer wall 31, 41, 51 of each slide out 30, 40, 50. Diagnostic instruments including but not limited to an ophthalmoscope, otoscope with speculums and dispenser, sphygmonomometer, and thermometer with probe covers may be located between patient bays 20 to service the two adjacent bays 20. Cardiac monitoring capability may be permanently mounted in the operating stations 125 and available at patient bays 120 using portable cardiac monitor/defibrillators. Having portable monitors facilitates more flexibility and allows each patient bay 120 to be potentially monitored.

Additional hardware at each patient bay 120 or operating station 125 may include cabinetry for storage 130 and intravenous line attachments for fluid resuscitation and hydration capability. The mobile medical facility 10 may also include supply carts for storing and moving around supplies. For example, the carts may have supplies for airway support (laryngoscopes, endotracheal tubes, and alternative airway adjuncts), intravenous lines (fluids, tubing, and start kits), pharmaceutical carts, and carts for minor laceration and burn care. The treatment areas may be stocked with standard emergency care and diagnostic supplies. Additional diagnostic equipment may include a portable ultrasound machine and x-ray unit. These two machines may be entirely mobile throughout the entire trailer 11. Preferably, the x-ray apparatus only requires a minimal radiation supply so that exposure is considered minimal.

As shown in FIGS. 25 and 26, the mobile medical facility 10 may also include an awning system 155 for extending the capabilities of the medical facility 10 outside the trailer 11. The awning system 155 may include a plurality of joists 156, a plurality of columns 157, and a tent canvas 158. The joist 156 and columns 157 together from a tent-like frame around the trailer 11. The canvas 158 is placed over the frame forming an enclosed and protective area. In order to raise the height of the tent-like frame a marquee system 159 may be placed on top of the trailer 11, providing a higher anchor point for the joists 156. Although the joists 156 and columns 157 may be made from a variety of materials, aluminum is preferred due to its weight and strength. For example purposes only and not as a limitation the enclosed area may include approximately 5600 square feet.

The purpose of the awning system 155 is to provide a more controlled environment for non-emergent patients. Fluorescent light boxes are suspended from the awning framework and are connected via pre-wired electrical connections affixed to the frame. This will provide sufficient illumination for all minor patient care activities. Heating for winter operations may be provided by electric heaters that are suspended from awning framework and distributed around the perimeter of the awning.

Cooling for warm weather operations may be accomplished through the use of electric fans that circulate the air under the awning system. All air coming in to this portion may also be HEPA filtered to 0.3 microns. Portable litters may be distributed throughout the floor space beneath the awning for medical monitoring and basic treatment. Appropriate staffing may be assigned to this area. Should a patient deteriorate, the patient may be moved to the more definitive treatment area inside the medical facility trailer 11.

When the awning system 155 is deployed, a complete patient care working environment is available. The enclosed area may be divided into two sections; one for patients categorized as a higher priority and one for lesser priority patients. Litters and litter stands may be available for those requiring such. Similar to the inside portion of the trailer 11, specialty care rolling carts will be available for the outside patient care area. Carts will include supplies for airway support, intravenous lines, and for minor laceration and burn care. The awning system 155 may include one or more entrances 160 as shown in FIG. 25.

In another aspect of the invention, the mobile medical facility 10 may include one or more additional trailers. For example, in the preferred embodiment, a second trailer 165 like the one shown in FIG. 3 serves as the support unit for equipment and supplies. The support unit incorporates a "two story" design that allows for maximum efficient use of storage. Larger/bulkier equipment is stored over head while smaller equipment, rolling carts, and replacement supply inventory is located on the lower level. Movement between levels is accomplished via lift gate on the rear of the trailer. Additional trailers may also serve as living or rest area for some of the medical personnel.

As shown in the illustrated embodiment, the trailer 11 is configured to be pulled by a tractor 12 and as such the trailer 11 may include two axles, each having four tires 170, and near the first and front end 22, the undersurface 25 is designed to engage the back of the tractor 12 for hauling.

The present invention has several advantages. In particular, the present invention provides a mobile medical facility 10 based on a trailer 11 that is easily transported over the roadways without requiring any extensive transportation means. The folding floors and slide outs 30, 40, 50 of the trailer 11 allow the trailer 11 to quickly expand to a medical facility with a robust floor area to treat several patients. If necessary, the awning system provides an effective way of adding additional capacity. The use of additional trailers allows for the mobile medical facility 10 to carry a large cache of supply and equipment. The mobile medical facility 10 is capable of being completely self-sufficient and may include generator power, running portable water, biohazardous waste disposal, lighting, heating, air conditioning and HEPA air filtration.

With the capability for critical care resuscitation, the mobile medical facility 10 can handle many of the emergency medical interventions to be rendered at a local hospital emergency department. Patients who were decontaminated can be brought into this mobile emergency department or medical facility 10 and be stabilized then transferred to a hospital or treated and released. The mobile medical facility 10 can play a key role on scene should there be a need for long distance transfer of patients beyond the region or via the National Disaster Medical system out of state.

The present invention has applications in the event of a biological terrorist incident. The mobile medical facility 10 may be used to provide medical support for a mega-shelter established at one of the major public facilities (i.e., area, convention center, etc . . . ) identified as shelter or quarantine for exposed or contagious victims. The mobile medical facility 10 may also be deployed to an airport or other reception location. Patients being off loaded from a limitary aircraft would have immediate access to a critical care treatment facility in the event their condition deteriorated during flight. Stabilization can be accomplished in advance of ground transfer to a regional receiving medical facility.

The present invention has other applications beyond terrorism to include any natural or man-made disaster that involves mass casualties that can overwhelm the capability of the local facilities to handle.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mobile medical treatment facility capable of being transported over the roadways and treating a plurality of patients suffering from a range of conditions or injuries, said medical treatment facility comprising: a trailer defining a floor area and having at least a first configuration and a second configuration, wherein in the second configuration the floor area of the trailer supports a first medical treatment patient area configured to provide general care to a plurality of patients and a second medical treatment patient area configured to provide surgical care to a least one patient and in the first configuration the floor area of the trailer is reduced to allow for the transporting of the trailer, wherein, in the second configuration, the first medical treatment patient area includes a first row of a plurality of patient treatment bays, a second row of a plurality of patient treatment bays and one or more curtains for dividing each of the patient treatment bays and for providing privacy therein and wherein, each patient treatment bay includes either a patient bed or chair and, in the second configuration, the second medical treatment patient area includes at least one operating station that includes an operating table for medical care.

2. The mobile medical treatment facility according to claim 1 further comprising a tractor for transporting the trailer.

3. The mobile medical treatment facility according to claim 1 further comprising an awning system for providing an extended patient care work environment adjacent to and substantially around said trailer.

4. The mobile medical treatment facility according to claim 1 further comprising a second trailer for storing equipment or supplies.

5. The mobile medical treatment facility according to claim 1 wherein the floor area in the second configuration is at least twice as large as the floor area in the first configuration.

6. The mobile medical treatment facility according to claim 1 wherein the trailer further includes a generator for providing power to the trailer; an air filtration system for filtering an air supply to the trailer, wherein the air filtration system maintains the air pressure inside the trailer at a higher level than the air pressure outside the trailer.

7. The mobile medical treatment facility according to claim 1 wherein the trailer further includes at least one heating source for providing heat to the trailer and at least one air conditioning source for cooling the trailer.

8. The mobile medical treatment facility according to claim 1 further comprising means for changing between the first and second configurations.

9. The mobile medical treatment facility according to claim 1 further comprising means for supplying an air supply for treating patients and a satellite communication system for providing telemedicine capability.

10. A mobile medical treatment facility capable of transporting over the roadways and treating a plurality of patients suffering from a range of conditions or injuries, said medical facility compromising:
a trailer having,
a first slide out, a second slide out, and a third slide out;
wherein each of the first, second, and third slide outs have a first and second position, a first configuration when each of the first, second, and third slide outs is in its first position, said first configuration defining a first floor area, a second configuration when each of the first, second, and third slide outs is in its second position, said second configuration defining a second floor area, wherein the second floor area is at least twice the first floor area, a first patient treatment area defined at least partially by the first and second slide outs and, in the second configuration, is configured to provide general care to a plurality of patients and includes a first row of a plurality of patient treatment bays, a second row of a plurality of patient treatment bays and one or more curtains for dividing each of the patient treatment bays and for providing privacy therein and wherein, each patient treatment bay includes either a patient bed or patient chair and equipment configured to treat a patient and, a second patient treatment area at least partially defined by the third slide out and, in the second configuration, is configured to provide surgical care to at least one patient and includes at least one operating station that has an operating table and equipment configured to treat a patient.

11. The mobile medical facility according to claim 10 further comprising an awning system that extends substantially around the trailer, when the trailer is in the second configuration, and provides an extended patient care work environment adjacent to said trailer.

12. The mobile medical facility according to claim 10 further comprising a tractor for pulling said trailer.

13. The mobile medical facility according to claim 10 further comprising a second trailer for providing a storage area.

14. A method for providing medical care to a plurality of patients comprising:

transporting a first trailer in a first configuration from a first location to a second location, wherein in the first configuration the first trailer defines a first floor area and wherein in the first configuration the first trailer defines a size and a shape for facilitating the transportation of the first trailer over roadways;

expanding first, second, and third slide outs of the first trailer in order to place the first trailer into a second configuration, wherein in the second configuration the trailer defines a second floor area greater than the first floor area; and providing a first medical treatment patient area defined at least partially by the first and second slide outs within the second floor area having a first row of a plurality of patient treatment bays and a second row of a plurality of patient treatment bays, wherein each treatment bay includes either a patient bed or patient chair, and providing a second medical treatment patient area defined at least partially by the third slide out within the second floor area having at least one operating station that includes an operating table; and providing one or more curtains for dividing each of the treatment bays for privacy therein.

15. The mobile medical facility according to claim 10, wherein, in the second configuration, the first row of the plurality of patient treatment bays of the first treatment area includes six patient treatment bays, the second row of the plurality of patient treatment bays of the first treatment area includes six patient treatment bays, and the second treatment area includes two operating stations.

16. The mobile medical facility according to claim 15, wherein the trailer includes a partition between the first and second treatment areas for controlling movement between the first and second treatment areas.

17. The mobile medical facility according to claim 11, wherein the awning system includes a plurality of litters, one or more supply carts, a light source, and an electric source for extending one or more of the medical capabilities of the mobile medical facility outside the trailer.

18. The method according to claim 14 further comprising placing an awning system substantially around the trailer to expend one or more medical capability of the mobile medical facility outside the trailer.

19. The method according to claim 18, wherein the awning system defines an enclosed area and further comprising dividing the enclosed area into a first section for patients categorized as a higher priority and a second section for patients categorized as a lower priority.

20. The method according to claim 19 further comprising designating one or more of the patient treatment bays of the first and second rows of the plurality of patient treatment bays of the first treatment area nearest the second treatment area as critical care patient treatment bays and designating one or more of the patient treatment bays of the first and second rows of the plurality of patient treatment bays of the first treatment area furthest from the second treatment area as general care patient treatment bays.

* * * * *